US008265683B2

(12) United States Patent
Santhanam

(10) Patent No.: US 8,265,683 B2
(45) Date of Patent: *Sep. 11, 2012

(54) TWO-TIER RANDOM BACKOFF AND COMBINED RANDOM BACKOFF AND TRANSMIT POWER CONTROL IN WIRELESS NETWORKS

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 939 days.

This patent is subject to a terminal disclaimer.

(21) Appl. No.: 12/187,537

(22) Filed: Aug. 7, 2008

(65) Prior Publication Data

US 2010/0034177 A1 Feb. 11, 2010

(51) Int. Cl.
*H04L 12/42* (2006.01)
*H04B 7/24* (2006.01)
*H04B 1/00* (2006.01)
*H04B 7/00* (2006.01)
*H04B 7/185* (2006.01)
*H04M 11/00* (2006.01)
*H04W 4/00* (2009.01)
*H04W 24/00* (2009.01)
*G01R 31/08* (2006.01)
*G06F 15/173* (2006.01)

(52) U.S. Cl. .............. 455/522; 455/39; 455/68; 455/69; 455/403; 455/422.1; 455/423; 370/241; 370/252; 370/445; 370/447; 370/448; 370/318; 709/230; 709/232; 709/235

(58) Field of Classification Search .................. 370/241, 370/252, 445, 447, 448, 318; 455/39, 68, 455/69, 403, 422.1, 423, 522; 709/230, 232, 709/235
See application file for complete search history.

(56) References Cited

U.S. PATENT DOCUMENTS

| 5,544,196 | A | * | 8/1996 | Tiedemann et al. | 375/145 |
| 5,838,904 | A | * | 11/1998 | Rostoker et al. | 709/250 |
| 6,118,997 | A | * | 9/2000 | Kim et al. | 455/424 |
| 6,404,750 | B1 | | 6/2002 | Wicker et al. | |
| 6,445,925 | B1 | * | 9/2002 | Kwon et al. | 455/446 |
| 6,631,121 | B1 | * | 10/2003 | Yoon | 370/329 |
| 6,674,765 | B1 | * | 1/2004 | Chuah et al. | 370/458 |
| 6,965,942 | B1 | | 11/2005 | Young et al. | |
| 7,082,472 | B1 | * | 7/2006 | Feder et al. | 709/235 |
| 7,272,400 | B1 | | 9/2007 | Othmer | |

(Continued)

FOREIGN PATENT DOCUMENTS

EP  0994603  4/2000

(Continued)

OTHER PUBLICATIONS

International Search Report, PCT/US2009/052778, International Searching Authority, European Patent Office, Nov. 30, 2009.
Written Opinion, PCT/US2009/052778, International Searching Authority, European Patent Office, Nov. 30, 2009.

(Continued)

*Primary Examiner* — Bobbak Safaipour
(74) *Attorney, Agent, or Firm* — Raphael Freiwirth

(57) ABSTRACT

Systems and methods for two-tier backoff interval randomization are presented. An initial message transmission can have both a chip level and an access cycle duration level backoff applied to avoid potential collisions. Additionally, improved transmit power calculations and the random backoff can be combined to further improve the probability of a successful message reception and decoding.

92 Claims, 11 Drawing Sheets

U.S. PATENT DOCUMENTS

| | | | |
|---|---|---|---|
| 7,313,105 B1* | 12/2007 | Lo et al. | 370/320 |
| 7,664,031 B2* | 2/2010 | Davis | 370/235 |
| 7,813,753 B2* | 10/2010 | Santhanam | 455/522 |
| 8,046,017 B2* | 10/2011 | Kludt et al. | 455/515 |
| 2002/0136929 A1* | 9/2002 | Oikawa et al. | 428/694 TM |
| 2002/0142791 A1 | 10/2002 | Chen et al. | |
| 2002/0154653 A1* | 10/2002 | Benveniste | 370/447 |
| 2002/0163929 A1 | 11/2002 | Li et al. | |
| 2003/0027580 A1* | 2/2003 | Goodjohn et al. | 455/453 |
| 2003/0087645 A1* | 5/2003 | Kim et al. | 455/453 |
| 2003/0189948 A1* | 10/2003 | Sashihara | 370/445 |
| 2003/0199252 A1* | 10/2003 | Tiedemann et al. | 455/69 |
| 2004/0127233 A1 | 7/2004 | Harris et al. | |
| 2004/0192371 A1 | 9/2004 | Zhao et al. | |
| 2004/0264423 A1 | 12/2004 | Ginzburg et al. | |
| 2005/0054288 A1 | 3/2005 | Agarwal | |
| 2005/0250511 A1 | 11/2005 | Xiao et al. | |
| 2005/0271076 A1 | 12/2005 | Ganti et al. | |
| 2006/0039281 A1* | 2/2006 | Benveniste | 370/230 |
| 2006/0148485 A1* | 7/2006 | Kangas et al. | 455/453 |
| 2007/0153719 A1* | 7/2007 | Gopal | 370/328 |
| 2007/0165665 A1 | 7/2007 | Gaur et al. | |
| 2007/0201377 A1* | 8/2007 | Santhanam | 370/252 |
| 2008/0071874 A1 | 3/2008 | Roodman et al. | |
| 2008/0137680 A1 | 6/2008 | Santhanam | |
| 2010/0034177 A1* | 2/2010 | Santhanam | 370/338 |
| 2010/0080114 A1* | 4/2010 | Ratnam et al. | 370/210 |
| 2011/0026409 A1* | 2/2011 | Hu et al. | 370/243 |

FOREIGN PATENT DOCUMENTS

| | | |
|---|---|---|
| EP | 1024606 | 8/2000 |
| EP | 1538810 | 8/2005 |
| JP | 2002232424 A | 8/2002 |
| JP | 2008541515 A | 11/2008 |
| WO | 9914869 | 3/1999 |
| WO | 02054622 | 7/2002 |
| WO | 03017621 | 2/2003 |

OTHER PUBLICATIONS

International Search Report, PCT-US07/062913, International Search Authority—European Patent Office, Jul. 2, 2007.

Written Opinion, PCT-US07/062913, International Search Authority—European Patent Office, Jul. 2, 2007.

International Preliminary Report of Patentability, PCT-US06/021384, International Search Authority—European Patent Office, Jun. 11, 2008.

Non-Final Office Action issued in U.S. Appl. No. 11/609,500, May 21, 2009.

Non-Final Office Action issued in U.S. Appl. No. 11/363,670, May 21, 2009.

US Non-Final Office Action issued in U.S. Appl. No. 11/364,148, on Jun. 11, 2009.

* cited by examiner

TWO-TIER RANDOM BACKOFF AND COMBINED RANDOM BACKOFF AND TRANSMIT POWER CONTROL IN WIRELESS NETWORKS

BACKGROUND OF THE INVENTION

1. Field

Embodiments of the invention generally relate to communication systems. More particularly, the invention relates to power control and random backoff control for access probes in communication systems.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x", and 1xEV-DO standards, "1xEV", for example) or TD-SCDMA.

In wireless communication systems mobile stations or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Conventionally, each mobile station monitors a control channel that can be used to exchange messages between the mobile station and the base station. The control channel is used to transmit system/overhead messages, whereas traffic channels are conventionally used for substantive communication (e.g., voice and data) to and from the mobile station. For example, the control channel can be used to establish traffic channels, control power levels, and the like, as is known in the art. Generally, there are two types of power control for the reverse link, open-loop and closed-loop power control. The open-loop power control conventionally occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems a pilot signal can be use to estimate the channel condition and then determine a power estimate for transmitting back to the base station. The accuracy of the channel conditions and power estimation can greatly impact performance of the system, particularly in terms of latency of the system. For example, 1x and 1xEV systems will transmit an access probe at a first power level based on a power control algorithm. If the first access attempt does not succeed, then the probe is resent at increasingly higher power levels, until it is successful or the power level maximum is reached.

In addition to the message loss due to power related issues (e.g., channel fading, time-varying ROT, etc.), access channel losses can also occur because of access probe collisions, which may be the case in geographically dense group calls. Losses that are caused due to the fading of the wireless channel can be minimized by increasing the transmit power of access probes. Losses due to probe collisions over the Access channel can be mitigated by ensuring that probe transmissions that are synchronized with respect to each other do not transmit their probes at the same time.

Accordingly, a method and system for jointly determining the transmit power of the access probe and the random backoff interval over which the access probe can defer its transmission can improve the system performance by reducing delays due to unsuccessful access probe transmission for geographically dense calls in wireless communication systems such as CDMA2000 1X-A and 1xEVDO networks.

SUMMARY OF THE EXEMPLARY EMBODIMENTS

Exemplary embodiments of the present invention are directed to systems and methods for random backoff and joint power control of access probes in a communication system.

Systems and methods for two-tier backoff interval randomization are presented. An initial message transmission can have both a chip level and an access cycle duration level backoff applied to avoid potential collisions. Additionally, improved transmit power calculations and the random backoff can be combined to further improve the probability of a successful message reception and decoding.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Figure 1:
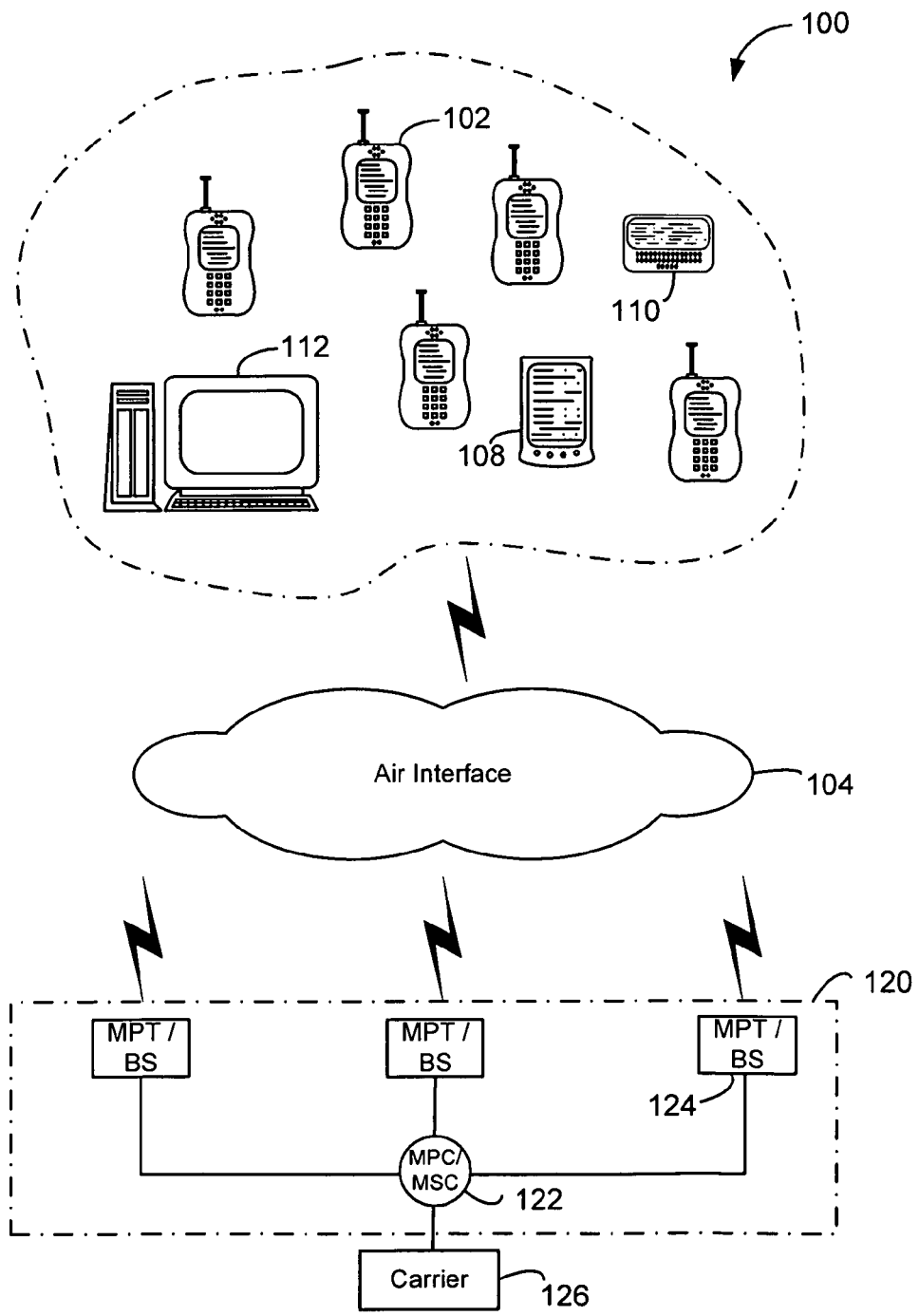
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) base station transceivers (BTS), base stations (BS) or more generally access points. An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to a PC card, external or internal modem, or wireless phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Additionally, although exemplary embodiments of the invention are described in terms of a wireless system and specific technologies such as CDMA 1x and 1XEV system, those skilled in the art will appreciate that the invention is not limited to the illustrated systems. For example, embodiments of the invention can include any system that uses a signal from an access point to estimate channel parameter and uses that estimation to control power in the reverse link. Those skilled in the art will appreciate that signals transmitted over many mediums can be considered to have channel parameters.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably. Also, as used herein the terms "access point", "modem pool transceiver (MPT)", "base transceiver station (BTS)", "base station (BS)" and like variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, a core network, the Internet, and/or other remote servers.

The RAN 120 controls messages (conventionally sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Conventionally, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is conventionally connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
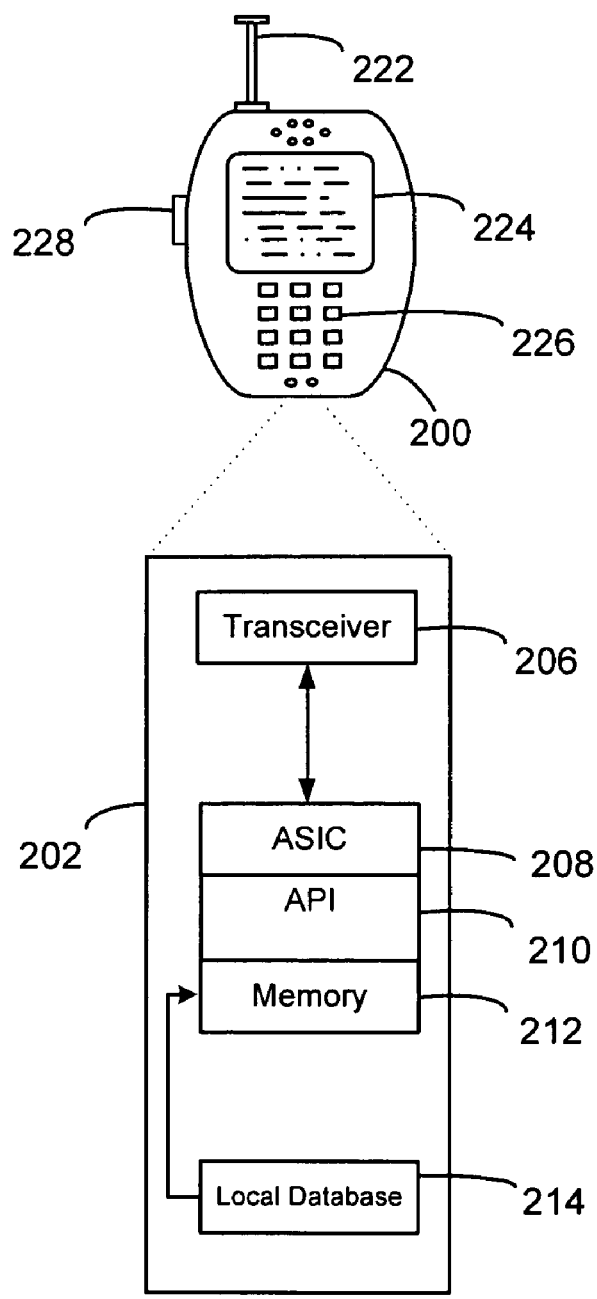
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is conventionally a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is conventionally between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN 120.

Paging can be used to notify an access terminal (e.g., a wireless device) that a communication directed to that terminal is available. Conventionally, the access terminal monitors a non-traffic channel (e.g., control channel/access channel) to check for paging directed to the access terminal and to receive power control signals and/or pilot signals that can be used to determine an initial power level of an access probe. Further, as discussed in the foregoing, the access probe's transmit power is determined by measuring a received signal strength (e.g., pilot signal) from a base station and estimating the forward link path loss. It is assumed that the path loss for the reverse link will be similar, so the access terminal can use this information to determine the access probe transmit power. The first transmission on the access channel may be in response to a page from the base station or to initiate a voice or data call. To avoid interfering with other access terminals, the initial power is conventionally set low and then the power is increased on successive attempts until the base station acknowledges the signal or a time out is reached.

Figure 3A:
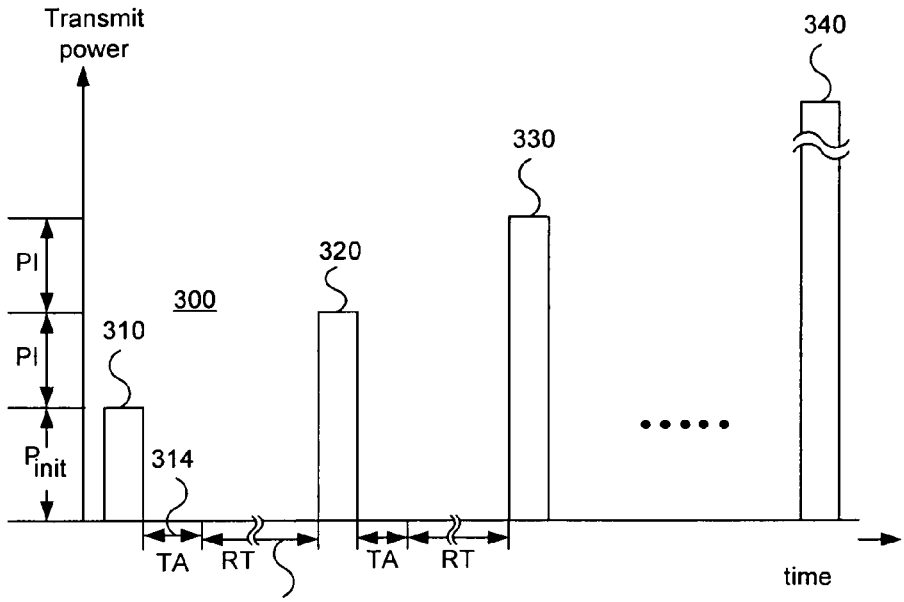
FIGS. 3A and 3B are illustrations of access probe sequences for various transmissions.

For comparison to embodiments of the present invention, a conventional sequence of access probes 300 is illustrated in FIG. 3A. The first probe 310 is transmitted at an initial power (Pinit) during a first access channel slot. The probe waits for acknowledgement from the access point (e.g., base station) or for an acknowledgement timeout 314 to occur. Then, a random backoff time is determined before the next access probe 320 is sent. As illustrated the second access probe 320 and subsequent access probes 330 and 340, will be sent using increasingly higher transmit powers until an acknowledgement is received, a maximum power is reached or the access process timeout occurs.

Figure 3B:
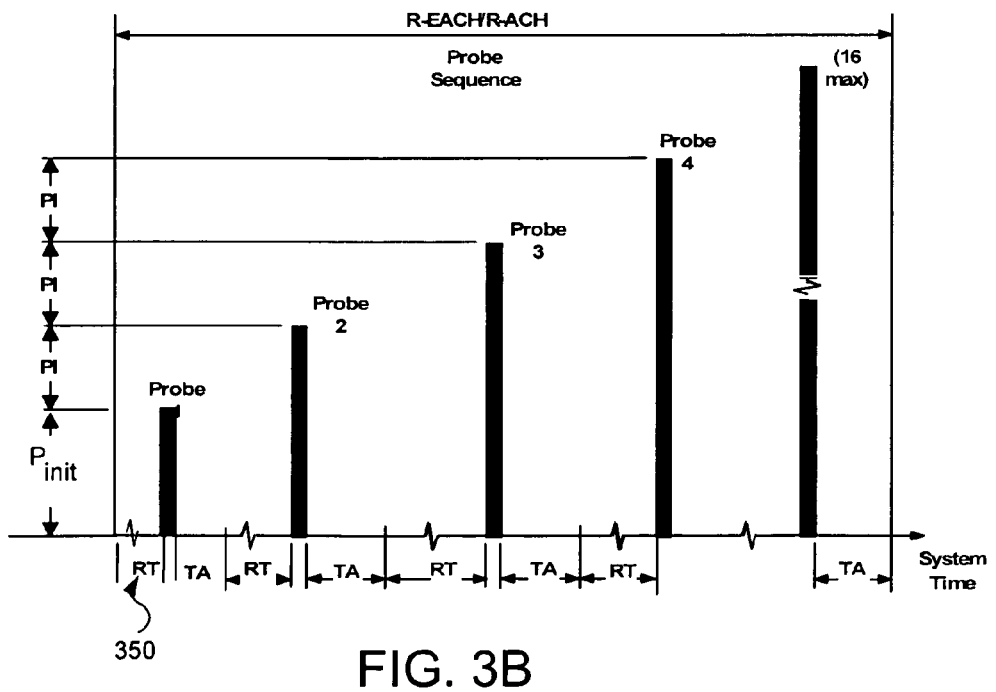

A reference diagram that illustrates an exemplary access procedure over the access channel in accordance with at least one embodiment of the invention is illustrated in FIG. 3B. As illustrated, an exemplary access procedure for embodiments of the invention differs from the standard-specified procedure in one aspect in that a random backoff operation 350 is performed even before the transmission of the first access probe. Additionally, the initial transmit power (e.g., $P_{init}$) is determined based on the channel load in embodiments of the invention. Accordingly, embodiments of the invention can use both the initial random backoff and the enhanced transmit power determination to increase the probability of successful receipt of the access probe.

Embodiments of the invention can use two-tier random backoff scheduling that includes both a chip level and access cycle duration (ACD) level random backoff. Further, power level control can be combined with the two-tier random backoff to further improve system performance. Aspects of each will be discussed in the following sections. Additional details regarding some of these features are included in co-pending U.S. patent applications Ser. No. 11/364,148, filed on Feb. 27, 2006 entitled "Backoff Control For Access Probe Transmission In Communication Systems" and "Power Control In Communication Systems", Ser. No. 11/363,670, filed on Feb. 27, 2006 having the same assignee as the present application and each application is incorporated by reference herein in its entirety.

In a conventional CDMA2000 or 1xEVDO network, the RAN has the ability to decode one access probe in a single access cycle duration (ACD) with high probability (e.g., ~98%), if the one access probe was the only access probe transmitted in that ACD. However, when N probes are transmitted within an ACD and they are less than 2 chips apart, then the probability of decoding a single access probe amongst N probes decreases sharply. In a conventional cell of radius 1000 meters, the maximum delay offset between any two probes amongst N simultaneous probes is approximately 4 chips, which can be determined as:

$$\frac{1000 * 1.25}{10^{-6} * 3 \times 10^8} \approx 4 \text{ chips.} \quad (1)$$

In general, probes collide with very high probability within 4 chips resulting in high loss rates of the access probes. This problem can be avoided by PN randomization (or chip level randomization). Since conventional RANs can only decode one access probe in an ACD, it is desired to ensure success of a probe when N probes are scheduled for simultaneous transmission/or collide. Accordingly, embodiments of the invention can use PN randomization to reduce or eliminate access probe failures due to collisions.

For example, let N probes transmit in a given access cycle duration (ACD) at time t=0. Let each probe apply a random delay offset in multiples of C chips in the interval [0, R*C], where the value of R and C may be predetermined. For example, the value of R can be in the range of 2 to 8 and the value for C can be in the range of 4 to 8 chips.

The probability of successfully decoding a single access probe when N probes perform PN randomization can be represented as W(N,R). A probe will be successful (i.e., received and decoded) with high probability (e.g., 98%), if it is received at the RAN (base station) at least C chips earlier than the other probes. The probability of this occurrence is a lower bound to W(N,R) and is given by:

$$W(N, R) \geq \frac{(1-PER)N}{(R+1)^N}\left(\sum_{i=1}^{R}(R+1-i)^{N-1}\right). \quad (2)$$

In the foregoing equation, PER is the Probe Error Rate on the first attempt. For example, in the case of N=2, R=4, and PER=0.02 the probability of receiving one probe ahead of the other probe is at least (0.98*R)/(R+1), i.e., $$W(2, 4) \geq \frac{0.98 * 4}{5} = 0.78. \quad (3)$$

Figure 4:
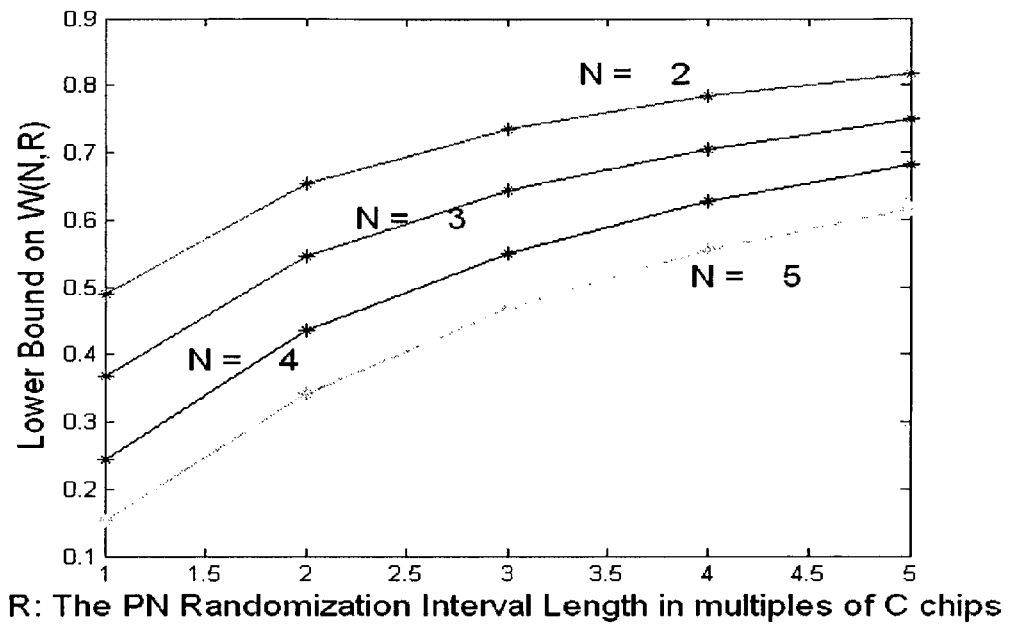
FIG. 4 is a graph illustrating bounds for various PN randomization interval lengths.

The value W(N,R) is plotted for as a function of R for various values of N in FIG. 4. Based on the foregoing equation 2, the value of R can be adjusted to a desired probability for a given value of N.

Figure 5:
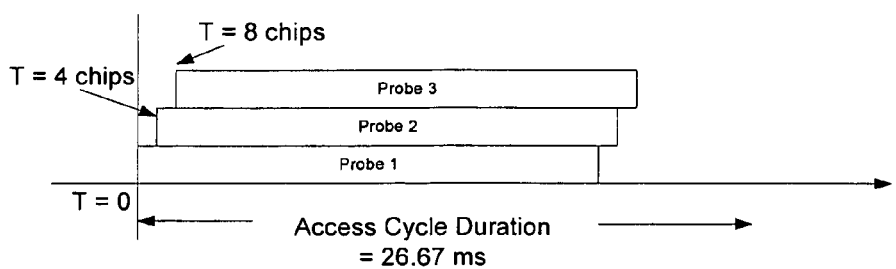
FIG. 5 is a chart illustrating various chip level offsets of the access probes.

In the absence of PN/chip level randomization, each AT will start transmitting at the start of the access cycle duration (e.g., T=0, 26,67 ms, 53.34 ms, etc.) and collide with each other, thereby reducing the chance of a successful decode at the RAN. However, using PN randomization according to embodiments of the invention, each AT delays its probe by a random delay offset (e.g., 0, 4 or 8 chips) from the start of the access cycle duration boundary, as illustrated in FIG. 5. Accordingly, this chip level randomization allows for greater chip separation and can improve the likelihood of success of a single probe significantly even if the probes are transmitted in the same slot/ACD.

The probability of successful receipt and decoding of an access probe is significantly high for a large range of values of N. However, the actual probability of success of a probe may even be higher since it is possible that a probe may be decoded (albeit with lower probability) when it is transmitted at the same time (chip-level synchronization) with other probes.

It is noted that in the above analysis, it was assumed that all the N handsets were geographically equidistant from the RAN. Since in most network deployments the cell radius is less than 2 kilometers, the maximum delay offset between probes is expected to be within 8 chips, a suitable value for C can help eliminate the likelihood of probes overlapping each other within a window of C chips. For instance if C is set to a value greater than 8 chips, then regardless of the location of handsets with the cell, the gains of PN randomization are achieved since any two probes will be offset by at least a few chips, a condition that is adequate for successful decoding of an access probe.

Collisions can occur on the access channel whenever two or more access probes start transmitting at the same time. This can be particularly probable in a geographically dense call region and/or when access attempts may be highly synchronized (e.g., in group communications). For example, in a group communications network, a large number of access terminals may be simultaneously paged and attempt to access the network. In general access terminals that get a page message may get synchronized with respect to each other within a time window (e.g., in an 80 msec. window of time) when transmitting the page response message.

As previously discussed conventional systems do not perform a random backoff at the chip level or ACD level during the initial transmission of the access probe. Accordingly, the probability of collisions on the initial access probe is greater than in subsequent access attempts. Embodiments of the invention use a two-tier (chip and ACD level) random backoff in the initial and subsequent transmissions to improve the probability of at least one successful access probe.

In one embodiment of the invention, one or both of the two-tier random backoff intervals can be a predetermined constant. For example, the chip level interval R and the random backoff interval variable D can both be set to predetermined values. These values can be based on a system design considerations such as, expected loading (e.g., expected value of N), average or maximum delay constraints, sensitivity of the base station receivers, etc. However, to further enhance the probability of the access probe being successfully received and decoded, the ACD level random backoff can be determined based on the channel load, as will be discussed in the following description.

The dependence of collision probability on the load on the access channel and the random backoff interval can be determined in closed-form. These results can be used in the development of an adaptive backoff algorithm that ensures successful delivery of access probes over the access channel.

For example, let N denote the number of access terminals that have a probe to transmit (or probes to be transmitted) over the access channel at time t=0. Each access terminal randomly defers its transmission by RT access cycle durations where $0 \leq RT \leq D-1$. The random backoff time RT can take integer values and can be uniformly distributed in the interval [0, D-1]. In one embodiment, D can be fixed to a pre-specified value. In this case, two probes will only collide with each other if their random backoff times RT are the same on the first access attempt. Collisions can also occur on subsequent access attempts if the access probes transmissions start at the same time.

Accordingly, the probability of M probes colliding in exactly K slots can be denoted as $P_K^M(N,D)$. The number of collisions in each of these K slots can be given as $I=\{i_1, i_2, \ldots i_K,\}$, where $i_1+i_2+\ldots i_K=M$. Then, $$P_K^M(N, D) = \sum_{i_1, i_2, \ldots, i_K} \frac{M!}{i_1! i_2! \ldots i_K!} \frac{N!}{M!(N-M)!} \frac{D!}{K!(D-K-(N-M))!} \frac{1}{D^N} \quad (4)$$

Or simply, $$P_K^M(N, D) = \sum_{i_1, i_2, \ldots, i_K} \frac{1}{K!} \frac{N!}{i_1! i_2! \ldots i_K!(N-M)!} \frac{D!}{(D-K-(N-M))!} \frac{1}{D^N}$$

For a collision to take place in a slot, at least two probes have to be transmitted. Therefore, $i_K \geq 2$ for all $k=[1, K]$ and $K \leq M/2$.

The foregoing illustration results if the BTS is only able to decode exactly one probe per access cycle duration, then a collision will occur if two or more probes start transmissions simultaneously (e.g., $i_K \geq 2$ for all $k=[1, K]$ and $K \leq M/2$). However, if the BTS is able to decode exactly J access probes transmitted in the same access cycle duration, then the foregoing equation can be modified by adding the constraint: $i_K \geq J+1$ for all $k=[1, K]$ and $K \leq M/(J+1)$ in the determination of $P_K^M(N,D)$. Accordingly, the results can be expanded to systems that allow for simultaneous decoding of the access probes.

In the following section, the impact on delay in successful delivery of an access probe as a function of the load on the access channel is analyzed for varying values of the random backoff duration. These results provide valuable insight to the development of the backoff algorithm, in accordance with embodiments of the invention.

To facilitate an understanding of the following disclosure definitions for various terms used therein will be provided. For example, the delay incurred by the first successful access probe out of N access probes is denoted by Minimum_Delay. Note that the minimum delay will impact latency sensitive applications. The delay incurred by the last successful access probe out of N access probes is denoted by Maximum_Delay.

The 50th and 80th percentile delay are defined as the delay experienced by the (N/2) and (0.8N) successful access probe, respectively. The terms ProbeBackoff and D may be used interchangeably, where ProbeBackoff=D-1.

Additionally, the following terms are described to aid in understanding the aspects of the invention presented herein.

N denotes the number of probes to be sent or the number of access terminals that have a probe to transmit over the access channel at time t=0. Each access terminal randomly defers its transmission by RT access cycle durations where $0 \leq RT \leq D-1$. The random backoff time RT takes integer values and is uniformly distributed in the interval [0, D-1].

$D_{max}$ denotes a system-specific pre-determined value that upper-bounds the value of D.

K denotes the number of access cycle durations in which a "collision event" takes place when N access probes contend to transmit over the access channel. A "collision event" is said to occur whenever two or more access probes start transmitting in the same access cycle duration.

M denotes the number of access probes that collide in K "collision events". Accordingly, $0 \leq M \leq N$.

NR denotes the minimum number of successful access probes on the first access attempt when N probes that are synchronized with respect to each other contend for transmissions over the access channel.

$P_0$ denotes the minimum probability of success of NR access probes on the first access attempt when N access probes contend to transmit on the access channel.

$P_K^M(N,D)$ denotes the probability of M probes colliding in K collision events when N access probes begin access procedures at the same time and defer their probe transmission by a random amount of time (in the interval [0, D-1] access cycle durations) prior to the first access attempt.

Further in the following illustration the following configuration parameters are assumed for the access channel.

Access cycle duration=16 slots, Preamble=4 slots.

Size of the access probe=16 slots (26.67 msec).

Probes that are lost due to access collisions will be retransmitted one (1) access cycle duration milliseconds (AC-MPTProbeTimeout=128) after the end of probe transmission. This is based on the smallest value as specified in the 1xEVDO Rev. A.

Persistence test is bypassed (i.e., threshold to pass is set to 0) for the calculated value D. (Note, in other embodiments persistence may be used as discussed below).

The message error rate due to channel induced errors is based on empirical data and simulations.

The delay incurred in transmitting access probes over the access channel can be analyzed as a function of the load on the access channel for different settings of D. The delay incurred by the first successful access probe out of N access probes is denoted by Minimum_Delay. The delay incurred by the last successful access probe out of N access probes is denoted by Maximum_Delay.

Figure 6A:
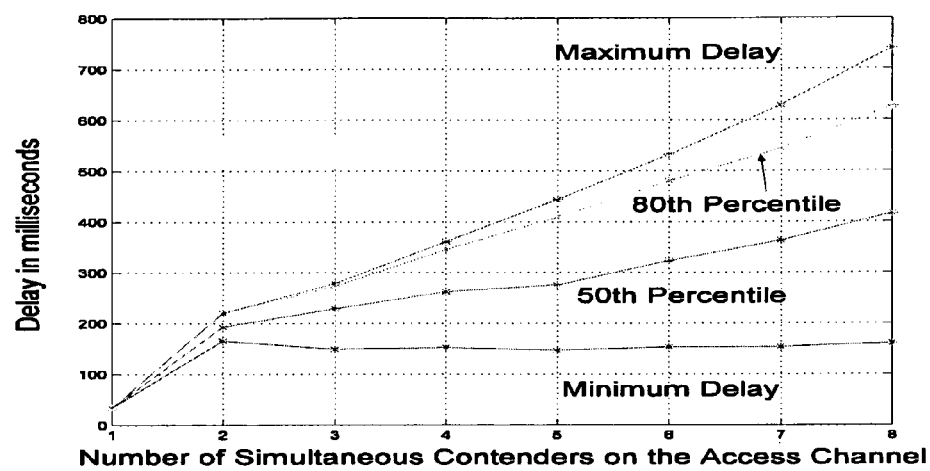
FIGS. 6A and 6B are comparisons of the number of simultaneous contenders on the access channel vs. delay for various conditions.

FIG. 6A illustrates the Minimum_Delay, Maximum_Delay, the 50th percentile and the 80th percentile delay as a function of N for a default setting in a 1xEVDO network. However, the invention is not limited to these settings. For example, in another setting for access probes, the access channel overrides persistence and performs a random backoff operation only for retransmissions, i.e., D=1 prior to the first access attempt and D=5 prior to retransmissions.

Each data point in FIG. 6A was computed by averaging over 500 runs. For the case of N=1, the Minimum_Delay=33.33 msec which is the lower value since the preamble+ payload is equal to 20 slots. The Minimum_Delay is approximately 150~160 msec for all values of N≧2. This is because in the default setting, the first access attempt always results in a collision because there is no random backoff before the first attempt. Since the first successful probe is generally successful in the second access attempt, the average value of can be determined as:

$$\text{Minimum\_Delay} = 2*(\text{Preamble} + \text{Payload}) + \text{ACMProbeTimeout} + \\ 0.5*\text{ProbeBackoff}*\text{AccessCycleDuration} + \text{Alignment with nearest cycle boundary} \quad (5)$$

In a specific embodiment, using the values noted above, this calculates as, Minimum_Delay=2*33.33+26.67+ 0.5*4*26.67+12*1.67=166 msec.

Alignment with the nearest Access Cycle boundary can result in an additional delay of 12 slots. Additionally, the average delay incurred as a result of performing a random backoff is not always equal to:

$$0.5*\text{ProbeBackoff}*\text{AccessCycleDuration}. \quad (6)$$

It can be considered a function of the backoff interval length and is conventionally less than the value of equation 6 for D>N. Accordingly, it will be appreciated that the value of D can impact the delay and D may be bounded by $D_{max}$ based on system delay sensitivities.

Figure 6B:
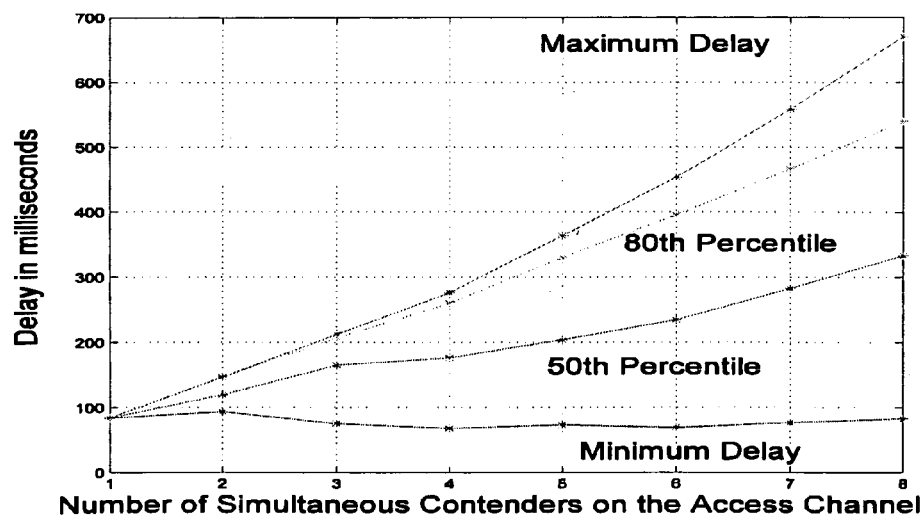

FIG. 6B illustrates the Minimum_Delay, Maximum_Delay and the 50th and 80th percentile delay as a function of N for an alternate setting wherein D=5 prior to each access attempts (including retransmissions). Each data point in FIG. 6B was also computed by averaging over 500 runs. For the case of N=1, the Minimum_Delay=33.33+56 msec. This value is higher than the corresponding value for the default setting because performing a random backoff prior to the first access attempt can result in an additional delay of 0.5*ProbeBackoff(=32) slots which is equal to 53.34 msec. Accordingly, performing a random backoff for the case of N=1 is not advantageous in terms of delay.

However for all values of N>2, the first successful access probe incurs an average delay of 87 msec which is significantly less than 166 msec. This is because performing a random backoff operation prior to the first access attempt results in a significant decrease in access channel collision probability and as a result at least one access probe is generally successful in the first access attempt. Following the first access attempt, both these experiments (FIGS. 6A and 6B) depict the same behavior as ProbeBackoff=4 for all retransmissions in either case.

The Minimum_Delay value directly affects the initial latency of the system. Accordingly, in latency sensitive applications, such as group communications, the initial latency should be reduced as much as possible. Additionally, for the group communications applications and other latency sensitive applications, the 50th percentile delay should be considered, as it can impact some target access terminals and cause loss of some initial media traffic. The 50th, 80th and the Maximum_Delay values are uniformly lower in FIG. 6B as compared to FIG. 6A for all values of N≧2. Accordingly, aspects of embodiments of the invention such as performing the random backoff procedure prior to the first access probe can yield significant reduction in delay.

Figure 7:
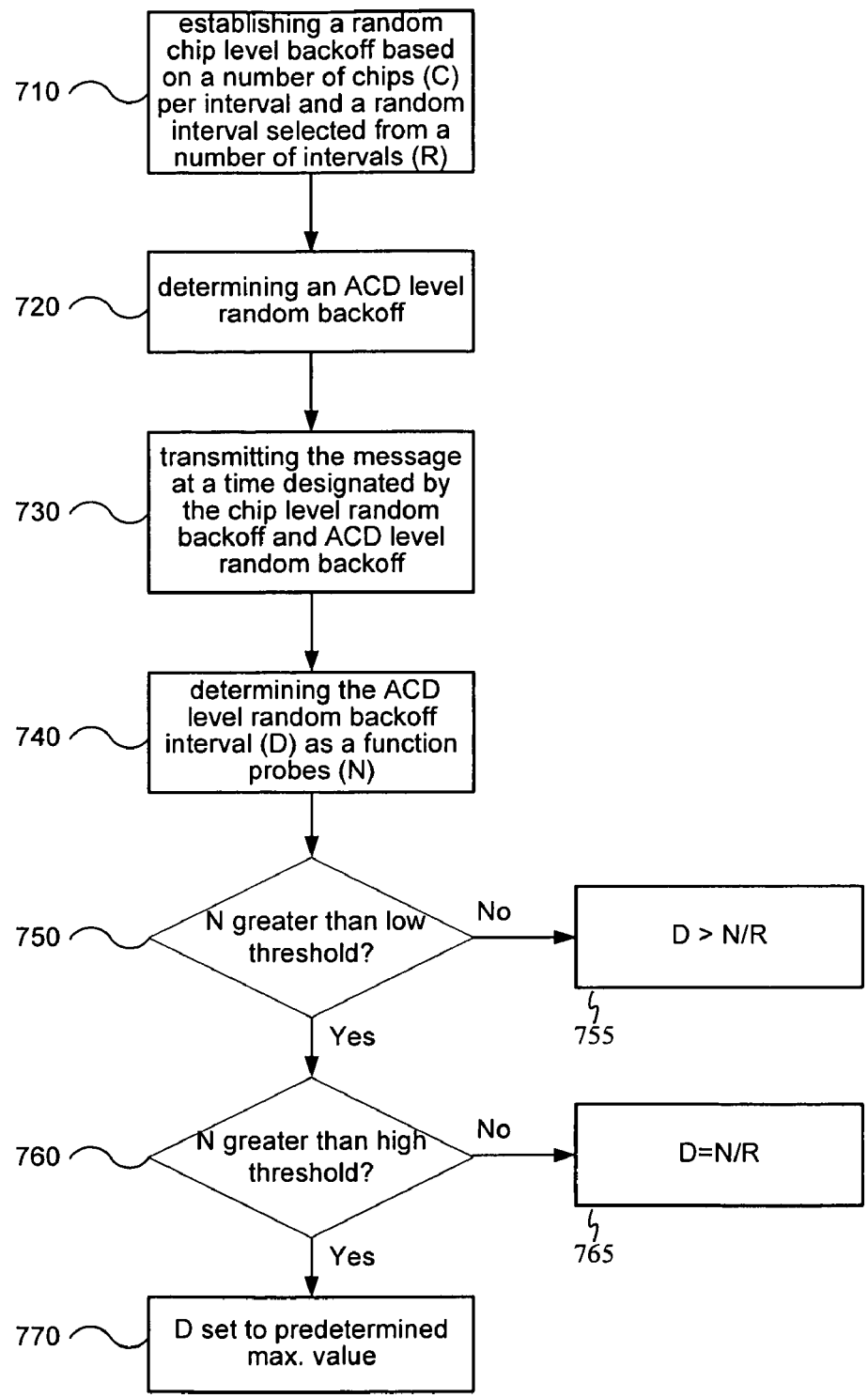
FIG. 7 is a flow chart illustrating methods in accordance with at least on embodiment of the invention.

The foregoing description discussed the ACD level backoff interval variable D in terms of channel load and is discussed in further detail in the co-pending application entitled "Backoff Control For Access Probe Transmission In Communication Systems" referenced above. The two tier randomization allows for further reduction and refinement of the ACD level random backoff. For example, as illustrated in FIG. 7, the process can start by establishing a random chip level backoff based on a number of chips (C) per interval and a random interval selected from a number of intervals (R), 710. A random ACD level back off is also determined, 720. The message can then be transmitted at a time designated by the chip level random backoff and ACD level random backoff, 730. As discussed above, the ACD level determining ACD level random backoff interval variable (D) as a function simultaneous probes (N), 740

By incorporating a chip level backoff, the value of D can be reduced while still achieving a high probability of a successful access probe. For example, assume the ACD level backoff interval variable D is set to N without any chip level random backoff. If the access probes are randomly distributed over R intervals at the chip level, the value of D can be recalculated to D=N/R, because the chip level backoff improves the probability of a successful probe even if the access probes are transmitted in the same slot/access cycle duration, as discussed in detail above. The determination of D can also be lower than D=N/R, if the RAN has the ability to decode multiple probes within an ACD, as discussed below. Further, alternative adjustments to D could be made using R, such as scaling R by a factor (e.g., 0.5). In some embodiments D can be rounded up to the nearest integer should the calculated value be a non-integer.

Accordingly, embodiments of the invention include a two-tier randomization where the ACD level random backoff includes determining a backoff interval (e.g., D) based on channel load of an access channel. The ACD level random backoff time is selected from the range defined by the backoff interval (e.g., 0-D-1 ACDs). The initial transmission of the access probe can then be delayed for the random backoff time. The value of D can be set equal to N/R, where N is a number of access terminals attempting to access the access channel (or access probes) and D is used to establish the backoff interval as [0, D-1] access cycles.

In one embodiment, D can be established as a non-decreasing function of a number (N) of access probes being sent. For example, D can be set equal to N/R, when N/R is less than a predetermined value and wherein D is equal to predetermined value for N/R greater than or equal to the predetermined value (see, e.g., 760, 765 and 770). In another aspect, as further illustrated in FIG. 7, D is set to a value greater than or equal to N/R, 755, for low values (e.g., N<10) of N, 750, e.g., when N is less than or equal to a low threshold. Further, D can be set to equal N/R, 765 for values between a low threshold and high threshold and then D can be set to a value of less than or equal to N/R or a predetermined maximum value, 770, for large values of N/R. Accordingly, the two-tier randomization can adapt for various channel load conditions. It will be appreciated that while the terms low and high are relative, they can be determined by system engineers and operators based one or more criteria or considerations such as the system configuration, expected channel loads, capture probability, and/or system tolerance for delay, for example.

Since the value of R will have less of an impact on the maximum or average delay experienced by a user, it may be fixed at a predetermined level and then the value of D can be adjusted based on that value of R. Alternatively, the value of R and D both could be adjusted to achieve a desired probability of a successful probe.

The backoff interval variable D can be establishing based on a quality of service constraint. For example, the quality of service constraint is defined as:

$$1 - \sum_{N=N-NR+1}^{N} \sum_{K=1}^{[\frac{N}{2}]} P_K^M(N, D) \geq P_0 \quad (7)$$

where $P_0$ is a probability of success, N is a number of access probes being sent, NR is the number of successful access probes, and K denotes a number of access cycle durations in which a collision event takes place when N access probes contend to transmit over an access channel. $P_K^M(N,D)$ as discussed above denotes the probability of M probes colliding in K collision events when N access probes begin access procedures at the same time and delay probe transmission by a random amount of time (in the interval [0, D-1] access cycle durations) prior to the first access attempt. Once again, this alternative method still will result in a value of D which can be adjusted based on the number of intervals (R) at the chip level. The value of D can be adjusted as D=D/R. Alternatively, the impact of the chip level backoff can be scaled by a factor that would increase or decrease the impact of R (e.g. D=D/(R*0.8)).

As noted above, some of the techniques in the foregoing ACD level backoff had the persistence test bypassed. However, in other embodiments persistence can be used in combination with the chip level randomization for the two-tier random backoff. In the foregoing, it was assumed that a random backoff procedure is performed prior to the first access attempt. However it is possible to accrue benefits similar to that achievable via the random backoff with alternate randomization procedures such as the persistence test pass procedure as defined in the 1xEV_DO Rev. A Air Interface specification as defined in "cdma2000 High Rate Packet Data Air Interface Specification", 3GPP2 C.S0024-A, Version 3.0, dated September 2006, which is incorporated by reference herein in its entirety. For example, setting the persistence probability to 1/N is approximately equivalent to setting D=N (discussed above) in terms of average collision rate performance on the access channel. The collision probability upon performing a persistence test is derived in the following equation. Assuming that each AT will pass the persistence test with probability q and defining vector $\bar{I}=\{i_1, i_2, \ldots i_K\}$ with $i_j$ denoting the number of ATs colliding in the $j^{th}$ access cycle duration following the start time t=0, the probability of M probes colliding is given as:

$$P_K^M(\bar{I}) = \left\{ \frac{N!}{i_1! i_2! \ldots i_K!(N-M)!} \prod_{k=1}^{K} \pi_k^{i_k} \right\} \prod_{j=1}^{N-M} \pi_{h_j} \quad (8)$$

where $i_1+i_2+ \ldots i_K=M$, $\pi_K=q(1-q)^{k-1}$, $i_j \geq 2$ and $\{h_j: j \in [1, N-M]\}$, where $h_j$ is the attempt number when an AT (out of N-M ATs that do not collide) successfully transmits its probe (i.e., does not experience a collision). Accordingly, as noted above, the persistence test can be based on the channel load (N) which is the number of ATs that have access probes to send and can be further refined based on the chip level interval randomization R. For example, as discussed above, the value of the persistence probability to can be set to 1/N, which could be further refined to setting the persistence probability to R/N.

Power control influences the ability for the probe transmission to overcome the channel parameters, such as Rise-over-Thermal (ROT), fading, etc. As illustrated in FIGS. 3A and 3B, the open loop power is conventionally increased for each subsequent probe transmission. However, the appropriate transmission power also is influenced by message parameters such as the message length (L), which is not considered in conventional power control algorithms. The two-tier random backoff control influences the probability of collisions for a given number of simultaneous channel contenders. Both of these aspects can influence the eventual success of the message (e.g., access probe) receipt at a given base station for a given set of conditions. Conventional systems fail to adequately address each of these controls and also fail to address the joint determination of these controls to achieve a desired message error rate (MER).

A conventional equation to estimate the initial transmit power in decibels in the open-loop case is defined in the IS-95 standard as:

$$P_{init} = -P_r - \text{Const} + \text{NOM\_PWR} + \text{INIT\_PWR} \quad (9)$$

where $P_r$ is the received power from the base station, Const is a default constant (e.g., -73 dB for cellular and -76 dB for PCS systems), NOM_PWR and INIT_PWR are adjustment factors that can be set by the system operator. The NOM_PWR and INIT_PWR can be broadcast from the base station along with other data in an access parameter message. Additional details of the conventional access probe and initial power estimates are not provided as these are well known in the art and can be obtained from references such as Yang, "CDMA RF System Engineering", Artech House, Inc., 1998, pages 85-88 and 141-145, which are incorporated herein in their entirety. Generally, $P_{init}$ in the foregoing equation 9 can be considered as a combination of the detected received power from the base station and a correction factor that can include constants and other system compensating factors (e.g., Const, NOM_PWR and INIT_PWR as discussed above). Additionally, the correction factors discussed in the following can be used in combination with or in place of the conventional system parameters.

The existing open-loop power control algorithms such as described above and used to transmit access probes over the access channel in CDMA2000 1X-A and 1xEVDO (e.g., IS-856 standard) networks are prone to inaccuracies and can result in underestimation of the transmit power for access probes. This underestimation can lead to an increased loss rate of access probes over the access channel, particularly on the first access attempt, as it is transmitted at the lowest power (see, e.g., FIGS. 3A and 3B). Existing open-loop power control algorithms often determine a transmit power that is lower because of: inaccuracies in estimating the path-loss between the access terminal and the access point/base transceiver station (BTS), crude estimation of the Rise-over-Thermal (ROT) at the BTS, and failure to take the size of the access message into account.

Embodiments of the present invention can overcome at least some of the problems associated with the existing open-loop power control policy so that a target success rate on the first access attempt is achieved. Thus, embodiments of the invention can use a correction factor or term to improve the initial power estimate and the target success rate on the first access attempt.

In another embodiment of the invention, the transmit power estimation of an access probe can be improved by adjusting the transmit power estimation using the access probes size (e.g., as measured in frames). For example, larger sized messages can be transmitted at higher power than smaller ones to compensate for potential channel/ROT variations during the course of message transmission. Accordingly, message size can be used as a correction factor to the access probe power level determination.

For example, when transmitting at a rate of 9.6 Kbps, an access probe can potentially be as large as four frames long. Each frame can be 16-slots in length. Thus, loss of even a single frame can lead to loss of the entire access probe. As a result, the transmit power for access probes that span multiple frames should be greater than the transmit power used for a single frame at the same data rate.

Transmissions over the reverse traffic channel (R-TCH), for example, for voice over IP (VoIP) messages can be operated at a target frame error rate (FER) of 1%. Similar target FERs can be expected of access probe transmissions as well. The wireless channel in cellular networks is generally uncorrelated between frame durations (since the coherence time of the wireless channel for most pedestrian/vehicular speeds is less than an frame duration). As a result, the frame-error process can be modeled as an independent and identically distributed (i.i.d.) random process and in particular by a Bernoulli random process. For an access probe of size L frames, achieving a message-error-rate (MER) of 1%, will use a target FER(L) of:

$$FER(L)=1-(1-MER)^{1/L} \qquad (10)$$

Figure 8A:
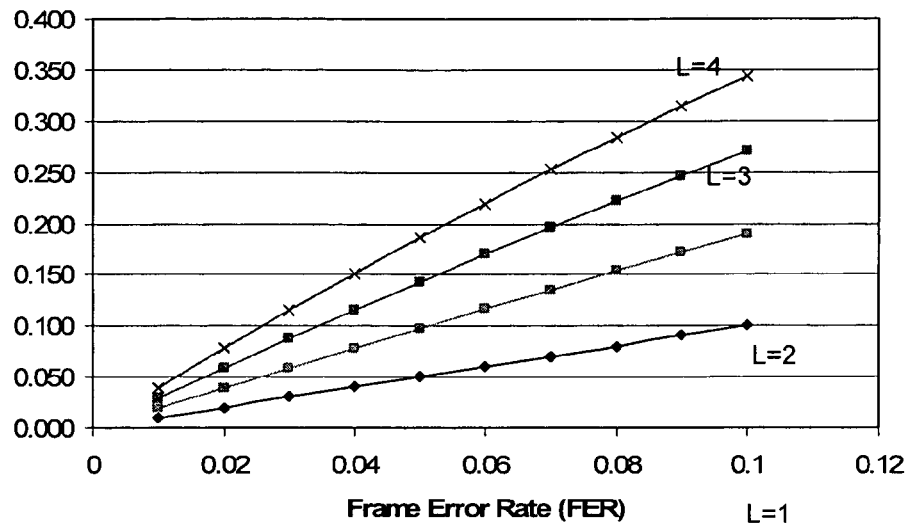
FIG. 8A is a graph illustrating the effect of message size on the message error rate for given frame error rates.

Generally, the MER can be considered to be related to the frame size as illustrated in FIG. 8A. As can be seen from FIG. 8A, the message error rate rises at increasing rates as the frame size increases.

Figure 8B:
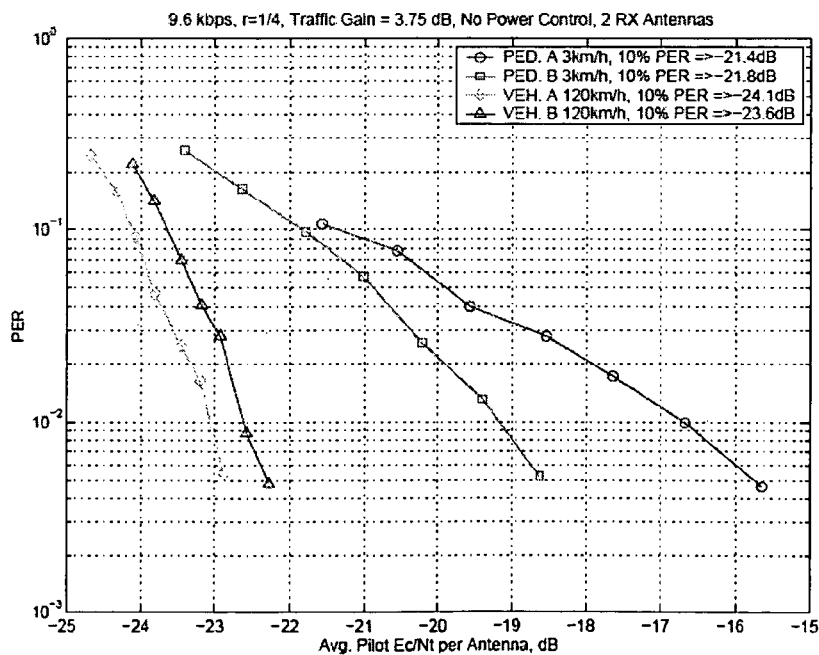
FIG. 8B is a graph illustrating a relationship between frame error rate and given wireless system conditions.

Further, referring to FIG. 8B, a graph is provided of PER (which is equal to $FER^2$) versus the pilot SNR (Ec,p/Nt) per antenna for different wireless channels with power control disabled (therefore R-TCH transmissions are identical to Access Transmissions). Accordingly, it can be determined that to achieve a target MER=1%, for L=2, FER(2)=0.5% and for L=4, FER(4)=0.25%. Based on the results illustrated in FIG. 8B, this would imply an additional 0.5 dB and 1 dB increase in transmit power is needed, respectively, in order to achieve a target MER of 1% over an entire range of vehicular speeds. If the operating FER is 10%, then FER(2)=5.13% and FER(4)=2.6%. For these error-rates, a correction factor of 1 dB and 2 dB for L=2 and L=4, respectively, can be used to achieve acceptable performance. These correction terms can be determined directly from FIG. 8B or could be derived from lookup tables.

It will be appreciated that similar calculations/simulations and/or empirical data can be obtained for other system parameters and conditions that will allow the determination of the correction factor based on the FER. The FER can be established based on the message size (L) and the target message-error-rate (MER) as discussed in the foregoing (e.g., as in Eq. 10). In general, those skilled in the art will appreciate that a small correction term can be used for messages that span L frames where L>1. The magnitude of the correction term is a function of the number of frames spanned by the access probe as well as the target MER that is desired.

As discussed above, the conventional open-loop power control algorithm does not take the size of the message into consideration. All messages regardless of their length are transmitted at the same signal power. It also assumes that the channel is likely to be constant over the transmission duration of the message. In contrast, embodiments of the present invention transmit longer messages at a higher minimum SNR ($\gamma_{min}$) value, which can be represented as:

$$\gamma_{min}(L) > \gamma_{min}(L-1) > \ldots \gamma_{min}(1). \qquad (11)$$

Conventionally, $\gamma_{min}(1)$ is about −15 dB. Accordingly, the transmit power can be adjusted based on the message size using the foregoing equation or using a fixed gain based on the message size (e.g., an additional 0.5 dB or 1 dB increase in transmit power, as discussed above).

Further, the open-loop power control algorithm for the reverse enhanced access channel (R-EACH) conventionally overestimates path parameter (G) by dividing the total received pilot signal power from all the access terminals in its active set by the transmit power of its associated access point. Due to this over-estimation of G, the transmit power P(L) can often times be set to a value that is less than the minimum power that will ensure successful delivery of the access probe, where P(L) is determined as:

$$P(L) = \frac{I_t}{G}\gamma_{min}(L). \qquad (12)$$

In the above formula, $\gamma_{min}(L)$ can be predetermined at the access terminal based on the target MER constraint, the size of the access probe L and the channel correlation coefficient. The path parameter G can also be determined accurately by the access terminal by dividing the received pilot signal power from its associated access point by the transmission power at the access point (or BTS). The transmission power can be, specified for example, in the Enhanced Access Parameters message or can be assumed to be a predetermined value which is generally set to about 10-20 Watts. The signal interference and thermal noise $I_t$ can be determined by assuming that the interference power incident at the access terminal is the same as the interference at the access point (BTS).

As discussed in the foregoing, information to enhance the transmit power determination can be transmitted from the wireless network. For example, the Rise-over-Thermal (ROT) at the access point/BTS can be transmitted to the access terminal so the actual ROT value is available at the access terminal to include in the correction factor and provide a more accurate determination of the desired initial transmit power and subsequent transmit power, if needed. Further, the number of users in a group call can be included in an initial call set-up message from the group communication server, which can serve as an estimate of the channel load, N, or as an upper bound on the channel load estimate.

Figure 9:
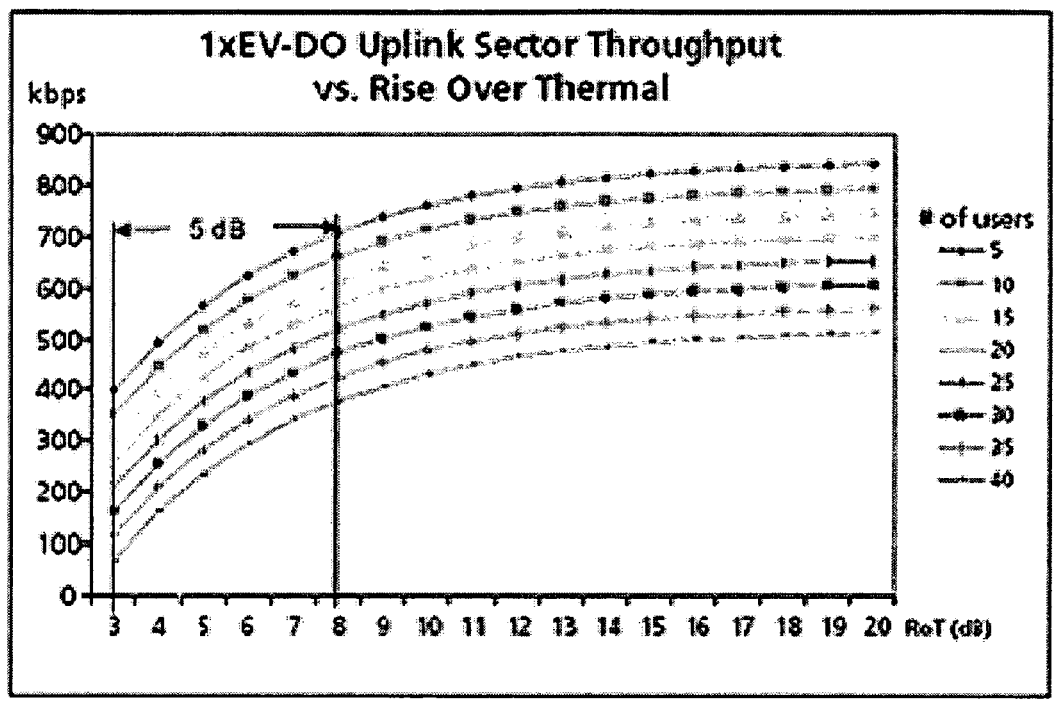
FIG. 9 is a graph illustrating a relationship for Rise-Over-Thermal (ROT) for various loading and wireless system conditions.

Alternately, the ROT can be determined at the AT by means of information transmitted on the number of users with traffic channel allocations and using a parameterized curve that estimates the dependence of ROT at the BTS as a function of the number of users with traffic channel allocations, such as illustrated by the curves in FIG. 9. It will be appreciated that the curves illustrated in FIG. 9 can be reduced to lookup tables, mathematical approximations, and the like to facilitate determination of the ROT at the access terminal.

For example, referring to FIG. 9, the mean ROT at the BTS is an increasing function as the number of access terminals increase. Further, the data rate also impacts the ROT for a given number of access terminals as illustrated. This information is available, for example in a paper entitled "CDMA Capacity and Coverage", published December 2006 by ADC Telecommunications, Inc., which is incorporated herein by reference in its entirety.

The number of active access terminals (who are given traffic channels) can be derived by the access terminal (AT) by means of signaling information (e.g., the QuickConfig message in 1xEV-DO). This information can be used by the AT to determine the expected ROT value at the RAN. The AT can then make a correction to its power value by using the expected ROT value, which can be derived from the stored curves/table and information regarding the number of ATs active in a given sector. Accordingly, the ROT value at the BTS can be determined without the BTS transmitting this information to ATs via broadcast messages.

Figure 10:
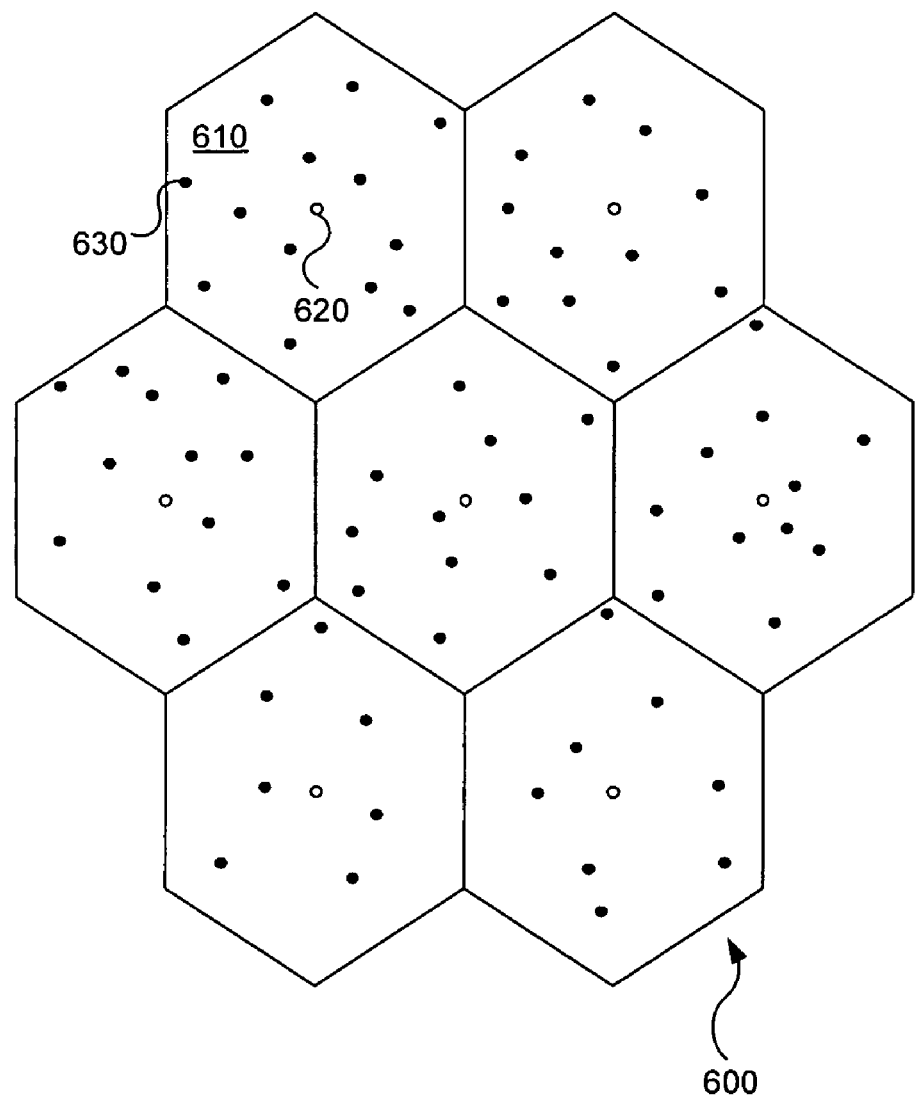
FIG. 10 is an illustration of a wireless system.

A simple numerical experiment to determine the amount of overestimation in G by access terminals when they are scattered across a large-scale cellular network can illustrate this problem. Specifically, consider a cellular network 600 having seven cells 610, each having an access point (BTS) 620 and associated access terminals 630, as illustrated in FIG. 10. The path-loss between the access terminal and the access point can be considered to be purely a function of the Euclidean distance between them (in this example the path-loss exponent for this example was assumed to be 2.8). The transmit power of each access point on the pilot channel was set to 20/64 Watts (e.g., 20 Watts distributed equally over 64 orthogonal Walsh codes, one of which is used for F-PICH). For this network topology, G computed by conventional open-loop algorithm ranges from 0–223% greater than the actual value with nearly half the mobiles overestimating G by 47%. As a result of this overestimation in G, the transmit power P(L) determined by the open-loop algorithm is less than the desired value by at least a factor of 1.5 for half the mobiles in the network and as many as one quarter of the mobiles underestimate their transmit power by a factor of 2. In the foregoing example, the path-loss was assumed to be purely a function of the distance.

Accordingly, an embodiment of the invention can further include determining a transmit power based on a predetermined gain factor that is applied to an initial calculated transmit power. For example, the initial calculated transmit power can be based on conventional algorithms, the adjusted power calculations described above or any other initial transmit power determination. The predetermined gain can be based on empirical data, such as on the order of 1.5 to 2 times, as discussed above. Alternatively, the predetermined gain can be adjusted to ensure that the transmit power is approximately the maximum transmit power. Additionally, the predetermined gain factor may not be applied if a received power from a base station is below a threshold value. Accordingly, only a subset of the ATs will have their transmit power increased and that subset can be determined to be those ATs that are in close proximity to the base station and/or have good channel characteristics as they would be the most likely to have a successful probe transmission. By limiting the ATs that have an increased transmit power the overall interference will be reduced, in comparison to having all ATs transmitting at higher power. Further, this will compensate the ATs that would conventionally be transmitting at lower power (e.g., the ATs that have the higher received power and better channel conditions), so the average transmit power of all ATs in a sector would not increase as much as applying the gain to remote ATs or ATs with poor channel conditions.

As discussed in the foregoing, message error rate (MER) can be a useful metric in determining a desired transmit power. In addition, MER can be used to establish a basis for determining the joint determination/optimization of the power and backoff control (including both PN randomization and/or ACD level randomization). As discussed above, the power control is influenced by the channel conditions and the message length. The backoff control was influenced by the instantaneous load on the channel. The following sections will discuss the combination of these aspects into a common optimization scheme because messages transmitted (e.g., over the R-EACH) are prone to loss either due to fast fading of the wireless channel, due to sudden changes in ROT, etc., and/or collisions as is the case in group calls or high density calls.

Losses that are caused due to the fading of the wireless channel can generally be minimized by increasing the transmit power of access probes. This was discussed above and a series of optimizations were presented to achieve a target success probability on the first attempt. However, the foregoing discussion did not directly consider the impact of channel loading and/or the random backoff interval in determining the transmit power.

Losses due to probe collisions over the R-EACH can be mitigated by ensuring that probe transmissions that are synchronized with respect to each other do not transmit their probes at the same time but perform a random backoff procedure even before each access attempt including the first one. This was also discussed in the foregoing sections and the effect of performing a random backoff interval on the collision probability as well as delay experienced by access probes was highlighted. Increasing the random backoff interval increases the average delay incurred by the access probe but guarantees a higher success probability.

In order to ensure that access probes are successful with high probability (e.g., 80-95%) on the first access attempt, the losses incurred as a result of the two aforementioned problems should be limited. Accordingly, joint consideration of transmit power of the access probe and the appropriate random backoff interval is considered so that the $\overline{MER}_Q$ is limited to within a predetermined value, such that $$\overline{MER}_Q \leq e_0, \quad (13)$$

where $\overline{MER}_Q$ is the probability of all probes failing and $e_0$ is a scalar value that can be used to establish a quality of service constraint by the system operator. For example, the lower the MER the better the overall service for a given network.

Generally the MER for an access probe over the R-EACH because of channel fading induced errors can be shown to be:

$$MER(\gamma, L) = 1 - (1 - FER_{ch}(\rho, \gamma))^L, \quad (14)$$

where $FER_{ch}(\rho, \gamma)$ is a function of the SNR (i.e., $\gamma$) of the link and $\rho$ is the channel correlation coefficient and L is the number of frames. Further, assume that exactly N access terminals are perfectly aligned in time at t=0 and have an access probe of length L frames to transmit over R-EACH. Defining the probability of an access probe colliding given that N probes are contending for R-EACH and performing a random backoff over the interval [O,D−1]R-EACH_SLOTS is given by the function $PR(N, D, i_1, i_2, \ldots i_K)$.

Embodiments of the invention apply the power determinations and/or the PN or chip-level backoff algorithm and quantify the gains via a weighting function W(S). After determining the weights, the random backoff algorithm can be used to determine D as a function of N. For example, assume that there are S simultaneous access probes are transmitted. Each AT applies the power control optimizations when transmitting the probe. Each AT also introduces a random backoff delay in the order of multiples of C chips in a pre-determined interval of [0, R*C] chips. Note that R can be predetermined. When performing backoff at the chip level, each AT randomly delays the probe transmission by 0 or C or 2C or 3C ... or R*C chips. A value of R=3 to 5 and C in the range of 4 to 8 can be used in some embodiments.

Using simulations, it is possible to determine the probability of success of a probe when S probes are transmitted with joint optimizations. The probability of success denoted by W(S) is used as a coefficient in the equation $P_K^M(N,D)$ determining an improve backoff algorithm. Specifically, the equation can be given as:

$$P_K^M(N, D) = \sum_{i_1,i_2,\ldots,i_K} \frac{M!}{i_1!i_2!\ldots i_K!} \frac{N!}{M!(N-M)!}$$

$$\frac{D!}{K!(D-K-(N-M))!} \frac{1}{D^N} W(i_1)W(i_2)\ldots W(i_K) \quad (15)$$

where $W(S)=1-W(S)$, N is the load on the access channel, D is the backoff probe interval in the foregoing equation. Using the equation above, an improved value of D can be determined as a function of N.

In one embodiment of the invention, the backoff probe interval variable D can be determined based on a capture probability of the system. In embodiments, capture probability can be used as an alternate to simulations to determine W(s). The term capture probability refers to the condition that even in the presence of collisions there is a probability that at least one or more probes (or messages) will be successfully decoded. The capture probability and the potential for collisions are impacted by both the channel load, N, backoff interval, D, and the transmit power/channel conditions. For example, assume it is determined that the system should be limited to a condition where it is highly probable that only two access probes will collide, then D will be set to approximately 0.5*N or considering the two-tier backoff D can be set to 0.5*N/R. Using this setting, the transmit power can be determined to increase the capture probability for the condition of two synchronized access channel transmissions (i.e., two probes colliding), as discussed herein.

For example, let exactly two access probes be transmitted at the same data rate in an access cycle duration. Let the received power (per chip) of the access probes at the BTS be $P_{max}$ and $P_{min}$ respectively where $P_{max} > P_{min}$. Let the total interference plus noise power (in mW) at the BTS be denoted by $I_0+n_0$. Then a conventional system will successfully decode one access probe if:

$$\frac{P_{max}}{P_{min} + I_0 + n_0} \geq \gamma_0. \quad (16)$$

where $\gamma_0$ is the minimum SINR required for successful decoding of the access probe. The minimum SINR for an Access Probe can be derived using the following formula:

$$\gamma_0 = \left(\frac{E_{c,p}}{N_t}\right)_{avg} \cdot (1 + E[10^{\frac{DataGain(Ch\_Rate)}{10}}]). \quad (17)$$

where Ec,p/Nt is the received pilot strength of the access probe. The worst-case value for Ec,p/Nt is −23.5 dB and a conventional value for it is −22.5 dB and the parameter DataGain(Ch_Rate) (given a rate of 38.4 Kbps, then DataGain (38.4 k)=9.75 dB). Therefore, for a 38.4 Kbps access channel it can be shown that $\gamma_0$=−12.7 dB or 0.0587 in linear terms.

Additionally, using a number of potential collisions permissible and channel load (N), the backoff interval variable (D) can be determined. For example, as the channel load increases, increasing the value of D can maintain a desired number of probable collisions (e.g., setting D=0.5*N allows for two collisions) or factoring in the chip level randomization D=0.5*N/R. The number of potential/probable collisions can also be used as a basis for determining an additional power correction based on the capture probability analysis discussed above. By increasing the transmit power to ensure a high probability of capture of at least one probe/message, the value of D can be reduced to reduce the maximum delay seen by the system. For example, D may be set to ½, ⅓, ¼, etc of N or N/R as the system can tolerate increased collisions (e.g., 2, 3, 4 collisions) and still decode the probe/message transmitted. If the calculated power level is acceptable, then the transmit power and random backoff interval can be set for transmission of the probe.

Tolerating increased collisions conventionally results in increasing the transmit power. As discussed above, the increased transmission power will increase the probability that at least one probe will be successfully received even in the presence of a collision due to the capture effect. Accordingly, the increased power level can be checked to determine if it exceeds a desired threshold or maximum permissible transmit power. If so, the backoff interval setting can be increased (e.g., a higher value of D) to mitigate the collision probability as the load will be randomly distributed over D intervals. Accordingly, the power increase can be recalculated based on the new parameters.

Figure 11:
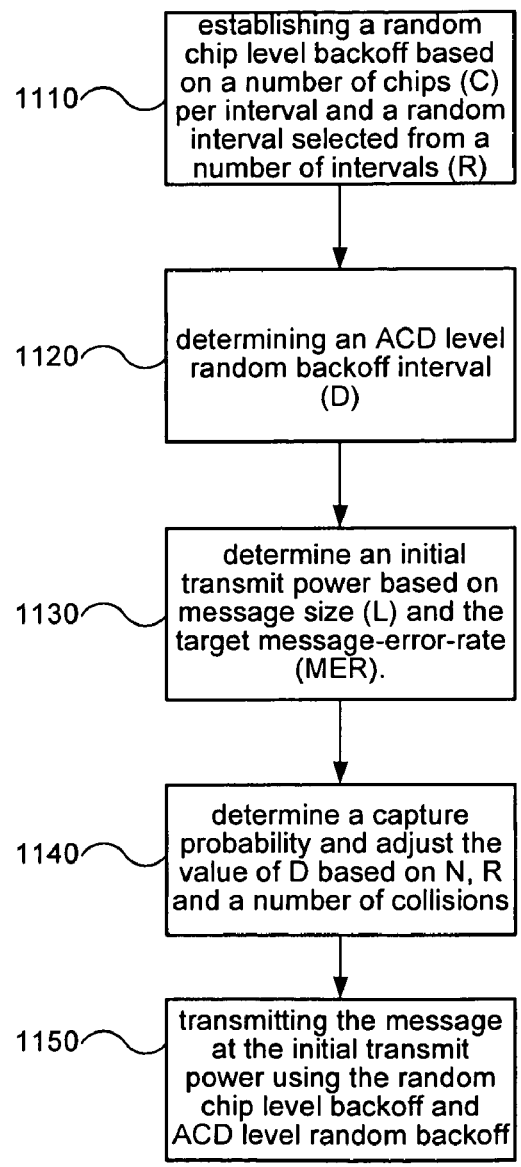
FIG. 11 is a flow chart illustrating methods in accordance with embodiments of the invention.

FIG. 11 is a flowchart illustrating aspects of embodiments of the invention discussed above. For example, a random chip level backoff can be established based on a number of chips (C) per interval and a random interval selected from a number of intervals (R), 1110. An initial ACD level random backoff interval (D) can be determined, 1120. An initial transmit power can be determined based on message size (L) and the target message-error-rate (MER), 1130. A capture probability can be determined and the value of D can be adjusted based on N, R and a number of collisions as discussed above, in 1140. The message can then be transmitted at the initial transmit power using the random chip level backoff in the interval of [0, R−1]*C and ACD level random backoff in the interval of [0, D−1].

As discussed in the foregoing, embodiments of the invention can improve system latency which can benefit all applications but is particularly important to delay sensitive applications. A group communication system is an example of a delay sensitive system that can take advantage of reduced connection times offered by embodiments of the invention disclosed herein. The group communication system may also be known as a push-to-talk (PTT) system, a net broadcast service (NBS), a dispatch system, or a point-to-multi-point communication system. Conventionally, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key on an AT, which generates a request formatted for transmission over a distributed network. For example, the request may be transmitted over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network RAN 120. However, the requests may also be transmitted through the public switched telephone network (PSTN) to a carrier network 126. The carrier network 126 may receive the request and provide it to distributed network 120.

Figure 12:
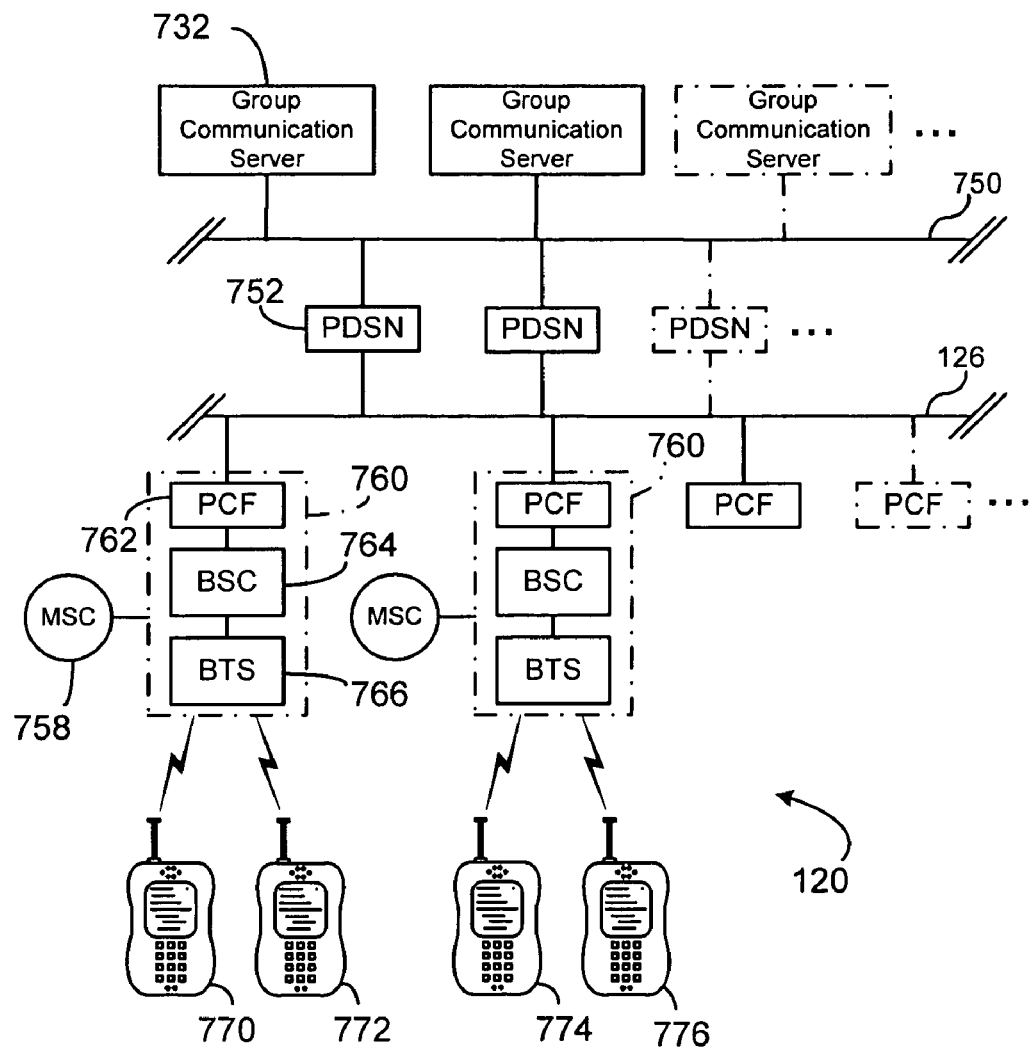
FIG. 12 is an illustration of a group communication network in accordance with at least one embodiment of the invention.

Referring to FIG. 12, one or more group communication servers 732, can monitor traffic of the group communication system through its connection to distributed network 120. Since group communication server 732 can be connected to the distributed network 120 through a variety of wired and wireless interfaces, geographic proximity to group participants is not necessary. Conventionally, a group communication server 732 controls communications between the wireless devices of group members (ATs 770, 772, 774, 776) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 732 can be connected to a group communication server LAN 750.

The group communication server(s) 732 can be connected to a wireless service provider's packet data service node (PDSN) such as PSDN 752, shown here resident on a carrier network 126. Each PSDN 752 can interface with a base station controller 764 of a base station 760 through a packet control function (PCF) 762. The PCF 762 may be located in the base station 760. The carrier network 126 controls messages (generally in the form of data packets) sent to a MSC 758. The MSC 758 can be connected to one or more base stations 760. In a similar manner to the carrier network, the MSC 758 is conventionally connected to the BTS 766 by both the network and/or Internet for data transfer and PSTN for voice information. The BTS 766 ultimately broadcasts and receives messages wirelessly to and from the wireless ATs, such as cellular telephones 770, 772, 774, 776, as is well known in the art. Accordingly, the details of a group communication system will not be further discussed.

In embodiments of the invention, the group communication server can be used to aid in the determination of the channel load. For example, during the initial call request, information regarding the number of group members, active group members or an estimate of active group members can be sent to the access terminals. The ATs can then use the information in determining the channel load. For example, the number information can be used directly as the channel load (N), can be scaled by a factor (e.g., 0.8) or can be used as an upper limit to verify other channel load determinations. For example, using the information as N the backoff interval value of D can be determined as K*N, where K is <1 or directly including the chip level backoff, D can be determined as K*N/R, where K is <1. As used herein the term "server" can include any device which may be coupled to the RAN or be contained within the RAN to communicate information to the access terminals, such as channel load information.

It will be appreciated that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for transmitting a message in a wireless communication system comprising:
    establishing a random chip level backoff, at a wireless device, based on a number of chips (C) per interval and a random interval selected from a number of intervals (R);
    determining an access cycle duration (ACD) level random backoff;
    transmitting the message at a time designated by the chip level random backoff and ACD level random backoff;
    wherein determining the ACD level random backoff comprises:
    determining a backoff interval based on channel load of an access channel;
    determining a random backoff time, wherein the backoff interval defines a range from which the random backoff time is selected;
    delaying the transmission of an initial transmission message for the random backoff time, wherein the message is an access probe; and
    wherein determining a backoff interval further comprises:
        setting D as equal to N/R, wherein N is an estimated number of access terminals attempting to access the access channel and D is used to establish the backoff interval as access cycles.

2. The method of claim 1, wherein R is in the range of 2 to 8 and C is in the range of 4 to 8.

3. The method of claim 1, wherein R is greater than or equal to 2.

4. The method of claim 1, wherein C is greater than or equal to 4.

5. The method of claim 1, wherein the number of intervals (R) is determined based on a probability of the message being successfully received and decoded.

6. The method of claim 5, wherein the probability (W) is determined as:

$$W(N, R) \geq \frac{(1 - PER)N}{(R+1)^N}\left(\sum_{i=1}^{R} (R + 1 - i)^{N-1}\right),$$

where N is an estimated number of probes in a given access cycle duration and where PER is the Probe Error Rate on the first attempt.

7. The method of claim 1, wherein the chip level random backoff interval and/or an interval of the ACD level random backoff are predetermined values.

8. The method of claim 1, wherein the ACD level random backoff is determined based on a probability of a successful message.

9. The method of claim 1, wherein the random backoff time is selected from integer values in the backoff interval [0, D−1].

10. The method of claim 1, wherein determining a random backoff time comprises: randomly selecting the random backoff time from a backoff interval of [0, D−1]*Tac, wherein D is an integer and Tac is approximately one access cycle.

11. The method of claim 10, wherein D is a non-decreasing function of an estimated number (N) of access probes being sent.

12. The method of claim 11, wherein D is equal to N/R when N/R is less than a threshold value and wherein D is equal to a predetermined value for N/R greater than or equal to the threshold value.

13. The method of claim 11, wherein D is set to a value greater than or equal to N/R for low values of N and wherein D is set to a value of less than or equal to N/R for high values of N/R.

14. The method of claim 1, wherein a quality of service constraint is used in determining the backoff interval.

15. The method of claim 14, wherein the quality of service constraint is defined as:

$$1 - \sum_{N=N-NR+1}^{N} \sum_{K=1}^{\left[\frac{N}{2}\right]} P_K^M(N, D) \geq P_0$$

where $P_0$ is a probability of success, N is an estimated number of access probes being sent, NR is a number of successful access probes, and K denotes a number of access cycle durations in which a collision event takes place when N access probes contend to transmit over the access channel and where $P_K^M(N,D)$ denotes a probability of M probes colliding in K collision events when N access probes begin access procedures at the same time and delay probe transmission by a random amount of time (in the backoff interval [0, D−1] access cycle durations) prior to a first access attempt.

16. The method of claim 15, wherein the quality of service constraint is the probability of success ($P_0$) for a desired number of access probes (NR).

17. The method of claim 15, wherein D is adjusted based on the number of intervals (R) at the chip level.

18. The method of claim 17, wherein D is adjusted to be determined as D=D/R.

19. The method of claim 1, wherein determining the ACD level random backoff comprises:
activating a persistence test to determine the ACD level random backoff.

20. The method of claim 19, further comprising:
setting a persistence probability based on an estimated number (N) of messages to be sent.

21. The method of claim 20, further comprising:
setting the persistence probability as 1/N.

22. The method of claim 20, further comprising:
setting the persistence probability as 1/(N/R).

23. The method of claim 1, further comprising:
determining a first transmit power correction based on message length.

24. The method of claim 23, wherein determining the first transmit power correction comprises:
increasing the first transmit power as the message size increases.

25. The method of claim 24, wherein the magnitude of the transmit power increase is a function of message size (L) and a target message-error-rate (MER).

26. The method of claim 25, wherein the MER is determined as:

$$MER(\gamma,L) = 1 - (1 - FER_{ch}(\rho,\gamma))^L,$$

where $FER_{ch}(\rho,\gamma)$ is a function of a signal to noise ratio ($\gamma$) and $\rho$ is a channel correlation coefficient.

27. The method of claim 1, further comprising:
determining an initial transmit power based on a Rise-over-Thermal (ROT) determination.

28. The method of claim 27, wherein in the ROT determination is based on a measured ROT received from a base station.

29. The method of claim 27, wherein in the ROT determination is estimated at an access terminal using a number of access terminals with traffic channel allocations and an estimation the ROT at a base station as a function of the number of access terminals with traffic channel allocations.

30. The method of claim 29, wherein the estimation the ROT at the base station is determined from at least one of a parameterized curve or a lookup table.

31. The method of claim 1, further comprising:
determining a transmit power based on a predetermined gain factor that is applied to an initial calculated transmit power.

32. The method of claim 31, wherein the predetermined gain factor is not applied if a received power from a base station is below a threshold value.

33. The method of claim 29, wherein the number of access terminals with traffic channel allocations is determined by signaling information received at the access terminal.

34. The method of claim 32, wherein the threshold value is determined based on an estimated proximity to the base station.

35. The method of claim 32, wherein the predetermined gain is on the order of 1.5 to 2 times.

36. The method of claim 32, further comprising:
adjusting the predetermined gain factor so the transmit power is approximately a maximum transmit power.

37. The method of claim 1, wherein the value of an ACD level backoff interval variable (D) is a function of a channel load (N).

38. The method of claim 37, wherein a number of potential collisions is used to determine a transmit power correction factor.

39. The method of claim 38, further comprising:
determining if the transmit power level exceeds a predetermined threshold value; and
increasing D when the transmit power level exceeds the predetermined threshold value.

40. The method of claim 37, further comprising:
determining a probability of success W(S) of a probe when S probes are transmitted, wherein W(S) is used as a weighting function in determining the ACD level backoff interval.

41. The method of claim 40, where in the weighting function is determined as:

$$P_K^M(N,D) = \sum_{i_1,i_2,\ldots,i_K} \frac{M!}{i_1!i_2!\ldots i_K!} \frac{N!}{M!(N-M)!} \frac{D!}{K!(D-K-(N-M))!} \frac{1}{D^N} W(i_1)W(i_2)\ldots W(i_K),$$

where $W(S)=1-W(S)$, and where the probability of M probes colliding in K slots is $P_K^M(N,D)$.

42. The method of claim 38, wherein D is determined as D=1/CPN*N, where CPN is an integer value of a number of messages that can collide while still decoding at least one message.

43. The method of claim 42, wherein D is further reduced based on R.

44. The method of claim 38, wherein D is determined as D=1/CPN*N/R, where CPN is an integer value of a number of messages that can collide while still decoding at least one message.

45. The method of claim 1, wherein determining the ACD level random backoff comprises:
receiving information regarding the channel load from a server;
determining a backoff interval value (D) based on channel load (N) of the access channel, wherein the channel load is determined based on the information from the server;
determining a random backoff time, wherein the backoff interval defines a range from which the random backoff time is selected; and
delaying an initial transmission of the message for the random backoff time.

46. The method of claim 45, wherein the information from the server is at least one of a number of group members, a number of active group members or an estimate of active group members of a group call.

47. The method of claim 46, wherein the information is used as the channel load (N).

48. The method of claim 47, wherein the backoff interval value of D is determined as K*N/R, where K is less than or equal to 1.

49. The method of claim 47, wherein the information is used as an upper limit for the channel load (N).

50. An apparatus configured to transmit a message in a wireless communication system comprising:

logic stored on a non-transitory computer-readable medium configured to establish a random chip level backoff based on a number of chips (C) per interval and a random interval selected from a number of intervals (R);

logic stored on a non-transitory computer-readable medium configured to determine an access cycle duration (ACD) level random backoff;

logic stored on a non-transitory computer-readable medium configured to transmit the message at a time designated by the random chip level backoff and the ACD level random backoff;

wherein the message is an access probe and wherein the logic stored on a non-transitory computer-readable medium is configured to determine the ACD level random backoff comprises:

logic stored on a non-transitory computer readable medium configured to determine a backoff interval based on channel load of an access channel;

logic stored on a non-transitory computer-readable medium configured to determine a random backoff time, wherein the backoff interval defines a range from which the random backoff time is selected;

logic stored on a non-transitory computer-readable configured to delay the transmission of an initial transmission message for the random backoff time; and wherein the logic stored on a non-transitory computer-readable medium to determine a backoff interval further comprises:

logic stored on a non-transitory computer-readable medium configured to establish D as equal to N/R, wherein N is an estimated number of access terminals having an access probe to send and D is a backoff interval variable used to establish the backoff interval as [0, D−1] access cycles.

51. The apparatus of claim 50, wherein R is in the range of 2 to 8 and C is in the range of 4 to 8.

52. The apparatus of claim 50, wherein R is greater than or equal to 2 and/or C is greater than or equal to 4.

53. The apparatus of claim 50, wherein the number of intervals R is determined based on a probability of the message being successfully received and decoded.

54. The apparatus of claim 53, wherein the probability of the message being successfully received and decoded (W) is determined as:

$$W(N, R) \geq \frac{(1 - PER)N}{(R+1)^N} \left( \sum_{i=1}^{R} (R+1-i)^{N-1} \right),$$

where PER is a Probe Error Rate on a first attempt.

55. The apparatus of claim 50, wherein the logic stored on a non-transitory computer-readable medium is configured to determine a random backoff time comprises: logic stored on a non-transitory computer-readable medium configured to randomly select the random backoff time from a backoff interval of [0, D−1]*Tac, wherein D is an integer and Tac is approximately one access cycle.

56. The apparatus of claim 55, wherein D is equal to N/R when N/R is less than a threshold value and wherein D is equal to a predetermined value for N/R greater than or equal to the threshold value.

57. The apparatus of claim 55, wherein a quality of service constraint is used in determining the backoff interval.

58. The apparatus of claim 57, wherein the quality of service constraint is defined as:

$$1 - \sum_{N=N-NR+1}^{N} \sum_{K=1}^{\left[\frac{N}{2}\right]} P_K^M(N, D) \geq P_0$$

where $P_0$ is a probability of success, NR is the number of successful access probes, and K denotes a number of access cycle durations in which a collision event takes place when N access probes contend to transmit over the access channel and where $P_K^M(N,D)$ denotes a probability of M probes colliding in K collision events when N access probes begin access procedures at the same time and delay probe transmission by a random amount of time (in the backoff interval [0, D−1] access cycle durations) prior to a first access attempt.

59. The apparatus of claim 58, wherein D is adjusted based on the number of intervals (R) at the random chip level backoff.

60. The apparatus of claim 59, wherein D is adjusted to be determined as D=D/R.

61. The apparatus of claim 50, wherein the logic stored on a non-transitory computer-readable medium configured to determine the ACD level random backoff comprises:

logic stored non-transitory computer-readable medium configured to activate a persistence test to determine the ACD level random backoff.

62. The apparatus of claim 61, further comprising:
logic stored on a non-transitory computer-readable medium configured to set the persistence probability as 1/N.

63. The apparatus of claim 61, further comprising:
logic stored on a non-transitory computer-readable medium configured to set the persistence probability as 1/(N/R).

64. The apparatus of claim 50, further comprising:
logic stored on a non-transitory computer-readable medium configured to increase an initial transmit power as the message size increases.

65. The apparatus of claim 64, wherein the magnitude of the initial transmit power increase is a function of message size (L) and a target message-error-rate (MER).

66. The apparatus of claim 50, further comprising:
logic stored on a non-transitory computer-readable medium configured to determine an initial transmit power based on a Rise-over-Thermal (ROT) determination.

67. The apparatus of claim 66, wherein in the ROT determination is based on at least one of:
a measured ROT received from a base station;
an estimate at the access terminal using a number of access terminals with traffic channel allocations and an estimation of the ROT at a base station as a function of the number of access terminals with traffic channel allocations; or
an estimation of the ROT at the base station, which is determined from at least one of a parameterized curve or a lookup table.

68. The apparatus of claim 50, further comprising:
logic stored on a non-transitory computer-readable medium configured to determine a transmit power based on a predetermined gain factor that is applied to an initial calculated transmit power.

69. The apparatus of claim 50, wherein a value of an ACD level backoff interval variable (D) is a function of a channel load (N) and wherein the message is the access probe.

70. The apparatus of claim 69, wherein a number of potential collisions is used to determine a transmit power correction factor.

71. The apparatus of claim 69, wherein D is determined as D=1/CPN*N, where CPN is an integer value of a number of messages that can collide while still decoding at least one message.

72. The apparatus of claim 69, wherein D is determined as D=1/CPN*N/R, where CPN is an integer value of a number of messages that can collide while still decoding at least one message.

73. A system comprising:
 a server configured to transmit information regarding channel load (N); and
 an access terminal comprising:
  logic stored on a non-transitory computer-readable medium configured to establish a random chip level backoff based on a number of chips (C) per interval and a random interval selected from a number of intervals (R);
  logic stored on a non-transitory computer-readable medium configured to determine an access cycle duration (ACD) level random backoff, including logic configured:
  to determine a backoff interval value (D) based on the channel load (N) of an access channel, wherein the channel load (N) is determined based on the information from the server and the backoff interval value of D is determined as K*N/R, where K is less than or equal to 1;
  to determine a random backoff time, wherein the backoff interval value defines a range from which the random backoff time is selected;
  to delay an initial transmission of an access probe for the random backoff time; and
  logic stored on a non-transitory computer-readable medium configured to transmit the access probe at a time designated by the random chip level backoff and the ACD level random backoff.

74. The system of claim 73, wherein the information from the server is at least one of a number of group members, a number of active group members or an estimate of active group members of a group call.

75. The system of claim 74, wherein the information is used as the channel load (N).

76. The system of claim 75, wherein the information is used as an upper limit for the channel load (N).

77. An apparatus comprising:
 means for establishing a random chip level backoff based on a number of chips (C) per interval and a random interval selected from a number of intervals (R);
 means for determining an access cycle duration (ACD) level random backoff;
 means for transmitting a message at a time designated by the random chip level backoff and the ACD level random backoff;
 wherein determining the ACD level random backoff comprises:
 means for determining a backoff interval based on channel load of an access channel;
 means for determining a random backoff time, wherein the backoff interval defines a range from which the random backoff time is selected;
 means for delaying the transmission of an initial transmission message for the random backoff time, wherein the message is an access probe;
 wherein the means for determining a backoff interval further comprises:
 means for setting D as equal to N/R, wherein N is an estimated number of access terminals attempting to access the access channel and D is used to establish the backoff interval as [0, D−1] access cycles.

78. The apparatus of claim 77, wherein R is in the range of 2 to 8 and C is in the range of 4 to 8.

79. The apparatus of claim 77, wherein R is greater than or equal to 2 and/or C is greater than or equal to 4.

80. The apparatus of claim 77, wherein the random chip level backoff interval and/or an interval of the ACD level random backoff are predetermined values.

81. The apparatus of claim 77, wherein the means for determining a random backoff time comprises: means for randomly selecting the random backoff time from a backoff interval of [0, D−1]*Tac, wherein D is an integer and Tac is approximately one access cycle.

82. The apparatus of claim 77, wherein D is equal to N/R when N/R is less than a threshold value and wherein D is equal to a predetermined value for N/R greater than or equal to the threshold value.

83. The apparatus of claim 77, wherein D is set to a value greater than or equal to N/R for low values of N and wherein D is set to a value of less than or equal to N/R for high values of N/R.

84. The apparatus of claim 77, wherein the means for determining the ACD level random backoff comprises:
 means for receiving information regarding the channel load from a server;
 means for determining a backoff interval value (D) based on channel load (N) of an access channel, wherein the channel load is determined based on the information from the server;
 means for determining a random backoff time, wherein the backoff interval defines a range from which the random backoff time is selected; and
 means for delaying an initial transmission of the message for the random backoff time.

85. The apparatus of claim 84, wherein the information from the server is at least one of a number of group members, a number of active group members or an estimate of active group members of a group call.

86. A non-transitory computer-readable medium including program code stored thereon for transmitting a message in a wireless communication system, comprising:
 program code to establish a random chip level backoff based on a number of chips (C) per interval and a random interval selected from a number of intervals (R);
 program code to determine an access cycle duration (ACD) level random backoff;
 program code to transmit the message at a time designated by the random chip level backoff and the ACD level random backoff;
 wherein the program code to determine the ACD level random backoff comprises:
 program code to determine a backoff interval based on channel load of an access channel;
 program code to determine a random backoff time, wherein the backoff interval defines a range from which the random backoff time is selected;
 program code to delay the transmission of an initial transmission message for the random backoff time, wherein the message is an access probe;

wherein the program code to determine a backoff interval further comprises: program code to set D as equal to N/R, wherein N is an estimated number of access terminals attempting to access the access channel and D is used to establish the backoff interval as [0 D−1] access cycles.

87. The non-transitory computer-readable medium of claim 86, wherein R is in the range of 2 to 8 and C is in the range of 4 to 8.

88. The non-transitory computer-readable medium of claim 86, wherein R is greater than or equal to 2 and/or C is greater than or equal to 4.

89. The non-transitory computer-readable medium of claim 86, wherein the random chip level backoff interval and/or an interval of the ACD level random backoff are predetermined values.

90. The non-transitory computer-readable medium of claim 86, wherein the program code to determine a random backoff time comprises: program code to randomly select the random backoff time from a backoff interval of [0 D−1]*Tac, wherein D is an integer and Tac is approximately one access cycle.

91. The non-transitory computer-readable medium of claim 90, wherein D is equal to N/R when N/R is less than a threshold value and wherein D is equal to a predetermined value for N/R greater than or equal to the threshold value.

92. The non-transitory computer-readable medium of claim 90, wherein D is set to a value greater than or equal to N/R for low values of N and wherein D is set to a value of less than or equal to N/R for high values of N/R.

* * * * *